United States Patent [19]
Stoll et al.

[11] Patent Number: 5,514,063
[45] Date of Patent: May 7, 1996

[54] MACHINE TOOL

[75] Inventors: Kurt Stoll, Esslingen; Udo Preussler, Leinfelden-Echterdingen; Peter Grund, Trossingen, all of Germany

[73] Assignee: Chiron-Werke GmbH & Co. KG, Tuttlingen, Germany

[21] Appl. No.: 331,558

[22] PCT Filed: Mar. 2, 1994

[86] PCT No.: PCT/EP94/00601

§ 371 Date: Jan. 3, 1995

§ 102(e) Date: Jan. 3, 1995

[87] PCT Pub. No.: WO94/20260

PCT Pub. Date: Sep. 15, 1994

[30] Foreign Application Priority Data

Mar. 3, 1993 [DE] Germany ............... 9303048 U

[51] Int. Cl.⁶ .................................. B23Q 3/157
[52] U.S. Cl. ................. 483/66; 91/407; 483/36; 483/38; 483/51
[58] Field of Search ................. 483/15, 66, 14, 483/53, 2, 13, 58, 52, 51, 36, 43, 44, 45, 49, 54; 91/407

[56] References Cited

U.S. PATENT DOCUMENTS

| | | | |
|---|---|---|---|
| 2,893,354 | 7/1959 | Austin et al. ............... | 91/407 |
| 3,191,505 | 6/1965 | Defibaugh et al. ............... | 91/407 |
| 3,431,635 | 3/1969 | Balding ............... | 483/66 |
| 3,681,829 | 8/1972 | Cupler, II ............... | 483/14 X |
| 3,724,331 | 4/1973 | Kobayashi ............... | 91/407 |
| 3,789,473 | 2/1974 | Pagella et al. ............... | 483/66 X |
| 4,034,867 | 7/1977 | Akagawa ............... | 483/53 X |
| 5,142,766 | 9/1992 | Whehrmeister ............... | 483/15 |

FOREIGN PATENT DOCUMENTS

| | | |
|---|---|---|
| 0033689 | 8/1981 | European Pat. Off. . |
| 0449768 | 10/1991 | European Pat. Off. . |
| 1931593 | 12/1970 | Germany . |
| 2036083 | 2/1972 | Germany . |
| 3506180 | 8/1986 | Germany . |
| 51-138979 | 11/1976 | Japan . |

*Primary Examiner*—William Briggs
*Attorney, Agent, or Firm*—Hoffmann & Baron

[57] ABSTRACT

A machine tool which comprises a headstock (111) and at least one tool changer (120). The tool change (120) shifts the production tools (116) between a magazine position and a working position, a drive unit (123) being provided for it in the form of at least one fluid power drive cylinder (1), wherein a piston is arranged for axial motion and for whose terminal fluid damping a damping device is provided. The drive cylinder (1) provided with a setting device, by means of which the terminal position damping may be switched over between at least two preset values.

19 Claims, 2 Drawing Sheets

MACHINE TOOL

Specification

The invention relates to a machine tool comprising a headstock, at least one tool changer adapted to move production tools between a magazine position and a working position, and at least one fluid power drive cylinder associated with the tool changer as a drive unit, said cylinder having a cylinder housing, in which an axially moving piston is arranged, for whose terminal damping a damping device is provided.

A machine tool of this type is disclosed in the European patent publication 0 205 030 A2.

In the known machine tool the piston frequently has to shift different machining tools with a relatively small and a relatively large weight. It will be clear that in such cases the adjustment of the damping device will only be a compromise. This however means that the degree of damping or braking will often be too weak when handling heavy objects while when handling light objects it will usually be excessive. In order to tackle this problem attempts have consequently been made to provide for additional choking of the feed air at the feed working space of the drive cylinder in order by regulation of the drive fluid under pressure to affect the normal speed and accordingly to affect the transition to the braking action. In practice this does however mean that substantial effort is necessary to match the settings of the speed choke valves and of the damping chokes in order to get the optimum damping performance. It has been found that in practice after only a few attempts at adjustment the user of the equipment will only be able to achieve quite unsuitable setting values, which are not even roughly applicable for the operation in hand.

In known machine tools there is furthermore the disadvantage that the drive valves and any further pilot control valves must be arranged separately from the machine tools with the result that for final assembly of such machine tools complex electrical wiring and pipe fitting operations are required.

Taking this prior art as a starting point one object of the present invention is to create a machine tool of the type initially mentioned, which can be quickly and easily adapted by the user for different damping specifications as required for particular conditions.

In order to achieve this object, in the invention the drive cylinder has a setting device associated with it, by means of which terminal position damping can be switched over between at least two preset values.

Using the setting device provided by the invention in the novel machine tool it is possible for the user to perform a rapid adaptation to various different conditions of use. Even during the manufacture thereof the setting device may be so designed that in the case of certain different conditions of use of the drive cylinder, taking into account intensity of damping dynamic the braked movement, there is an optimum transition from normal movement to damping, braked movement. In accordance with the respective load occurring the setting device merely has to be switched over to the associated speed predetermined value. In most cases it will be sufficient to provide two predetermined values, which on the one hand apply for a low load range and on the other hand for a higher load range.

It is in the special case of machine tools that there is a need for drive cylinders to be mounted in a dependent manner and for machining tools with a greater and a lesser weight to be arranged on the piston rod in succession. In this case it would for instance be possible to so select a first predetermined weight value that the weight range of 1.8 to 5 kg is covered, whereas the second possible predetermined weight range covers the range between 5 kg and 8 kg. Naturally it would be possible to vary the range limits and to arrange for overlap thereof on a case to case basis. For handling small weights the designer will best so proceed that the associated speed predetermined value renders possible a high normal speed, whereas for conveying heavy masses the normal speed will be reduced by the corresponding predetermined speed value so that on changing over to braked movement an aperiodic speed characteristic will be ensured at least approximately. Accordingly there is no need for complex setting of any choke values and damping chokes in order to discover the optimum damping behavior. It will be clear that the setting device may be so designed from case to case that more than two predetermined speed values can be set for.

Drive cylinders with damping means are disclosed as such for example in the German patent publication 3,427,690 A1 or 2,830,416 A1. A setting device for switching over between different damping presets is however not disclosed therein.

Further advantageous forms of the invention are recited in the dependent claims.

The setting device is preferably mounted on the drive cylinder. This involves the advantage that the drive cylinder with the setting device mounted thereon is able to be put together beforehand so that final assembly of the new machine tool is substantially facilitated. It is not necessary to have different fluid power and electrical connections for setting the damping of the terminal position.

It is quite possible to arrange a fixed value choke, known as a set choke, even in the discharge duct, which by means of its resistance to flow sets the maximum possible normal speed, which for a given load state or weight range pro-establishes the optimum discharge rates. In this case the setting device will as a rule be so designed that its resistance to flow in the first speed preset value is at the most equal to, and preferably smaller than the flow resistance of the set choke. The resistance to flow of the setting device then has no or only an insubstantial effect. In the second speed preset value however the set choke will be followed by a greater resistance to flow of the setting device so that there is practically a series arrangement of chokes, the significant portion of the resulting resistance to flow being set by the resistance to flow pre-established by the setting device.

Given a suitable design it is possible for the setting device to be effective in either direction of movement of the piston, because it is connected via suitable discharge ducts with both working spaces of the drive cylinder and for each discharge duct possesses at least two speed preset check values. The values of the resistance to flow due to the setting device may then be identical for either direction of piston movement or, dependent on the application, different.

The switching over of the setting device can be performed directly manually by providing suitable actuating means on the setting device, which are set by hand as the case may be. If the setting device is arranged directly on a drive cylinder, then it is however expedient to provide for remote control thereof so that it is unnecessary to perform operations within the range of motion of the drive cylinder.

It is an advantage for the setting device to be mounted directly on the cylinder housing of the drive cylinder and as a complementary feature to arrange a power valve thereon, which as regards its effect is placed upstream from the setting device. Both the power valve and also the setting device are preferably located on the same one cylinder end plate, if provided, on which furthermore a chamber may also be provided, in which means are accommodated for the electrical control of the power valve and/or the setting device. It is in this manner that the an integral drive cylinder is provided, which constitutes an extremely compact fluid power drive unit.

In what follows the invention will be explained with reference to the accompanying drawings in more detail.

Figure 1:
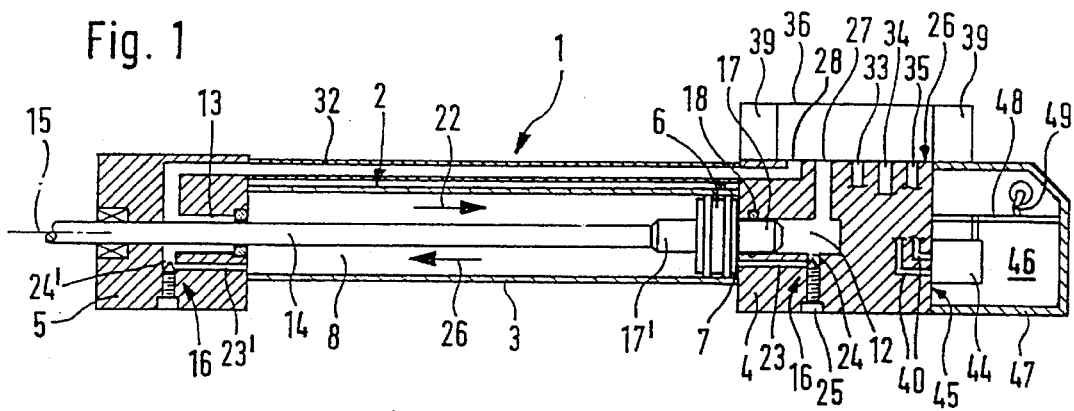
FIG. 1 shows a first embodiment drive cylinder arrangement in a diagrammatic elevation and in a longitudinal section taken on the line I—I of FIG. 2, the setting device being omitted and the cylinder ducts running to the power valve being merely indicated in part, it being possible for the same to be extended to the power valve in a different circuit.
Figure 2:
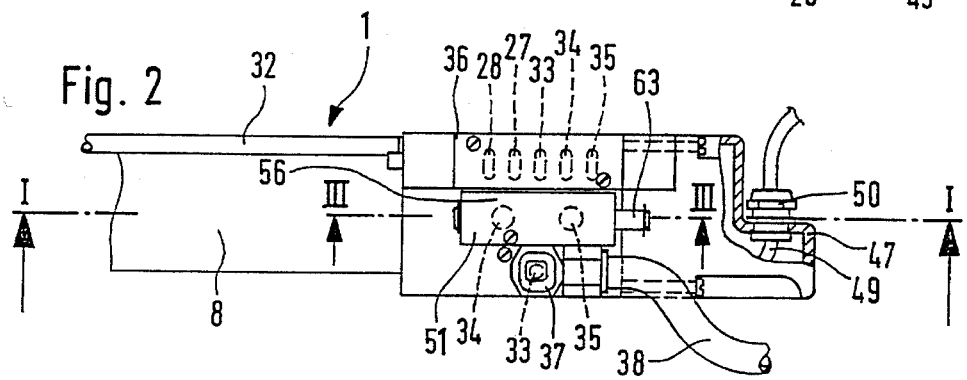
FIG. 2 is a plan view of the drive cylinder arrangement in accordance with figure, only one terminal part of the drive cylinder being depicted.

FIGS. 1 and 2 depict a pneumatic drive cylinder 1. It possesses a cylinder housing 2 with a tubular housing portion 3 at whose two ends a respective cylinder end plate 4 and 5 is arranged. In the tubular housing portion 3 an axially reciprocating piston 6 is located, which divides off two working spaces 7 and 8 from one another in a sealing manner. Into each working space there opens a fluid duct 12 and 13 extending through the associated end plate 4 and 5, such fluid ducts rendering possible the supply and/or discharge of a fluid power medium, more especially compressed air, into and, respectively, from the associated working space 7 and 8 in order in this manner to cause an axially directed stroke of the piston 6.

The piston 6 is connected with a piston rod 14, which extends in the axial direction 15 and at least, as illustrated, extends through one of the housing end plates 4 and 5 to the outside. On the piston rod section which is outside the cylinder housing 2 loads, as for instance production tools, may be detachably secured in a familiar manner.

During operation of the drive cylinder 1 on movement of the piston rod in either of the two possible stroke directions the piston 6 performs a normal movement at a nominal or standard speed and a braked piston movement whose speed is less than the normal one. The braked piston occurs during the respective last part of a path, starting at a certain piston position, herein named the brake position, and terminating on reaching the respectively end of a stroke, at which the piston 6, or a part integral with it, Strikes one of the end plates 4 and 5. One of such terminal positions is indicated in FIG. 1. During the braked movement the piston 6 is retarded, this being a terminal position damping action. Such damping action is caused by a damping device 16, which in the present example is effective in each of the two Stroke directions and is integrated in the cylinder housing 2 more especially in the two housing end plates 4 and 5.

The damping device 16 has an identical structure for both stroke directions. The description will consequently be limited to the means of such damping device which take effect in the inward direction. Such means include firstly a buffer part 17 connected so as to move with the piston and which possesses a piston-like structure and is therefore frequently referred as a buffer piston. It extends axially away from the piston toward the associated housing end plate 4, it being axially opposite to the opening of the drive fluid duct 12. In the braking position the buffer part 17 starts to plunge into the drive fluid duct 12 and on reaching the end of the stroke of the piston 6 it extends to the maximum extent into the drive fluid duct 12. As soon as the buffer part 17 enters the drive fluid duct 12, its opening, which faces the associated working space 7 is closed in a fluid tight fashion. For this purpose a sealing ring 18 can be provided adjacent to a duct opening, such ring surrounding the buffer part 17 which has entered the duct.

When the piston 6 performs its stroke in the stroke direction 22, the volume of the working space 7 associated with the buffer part 17 is reduced, the piston 6 expelling drive fluid out from the working space 7 via the drive fluid duct 12. Owing to relatively large cross section of the drive fluid duct 12 in this respect the normal speed of the piston 6 may be relative high. However as soon as the opening of the drive fluid duct 12 is shut off by the buffer part 17, the discharge path for the drive fluid is blocked. Now it may merely flow out via a shunt duct 23, which bypasses the closed duct opening. It is on the one hand open toward the working space 7 and on the other hand opens into a lower down section of the drive fluid duct 12, which is not reached by the buffer part 17, which has plunged into the duct. The shunt duct 23 is a choke duct, that is to say the flow cross section made available by the same is somewhat less than the cross section, which is normally provided by the open opening of the drive fluid duct 12. The degree of the choking action is preferably able to be varied, for which purpose a choke or constriction is provided which is constituted by the cooperation between a damping screw, which in the following is referred as the choke screw 25. The depth of penetration of such damping screw 25 is varied in order to vary the resistance to flow and accordingly the intensity of choking.

Since as from the time at which the braking position is reached the displaced drive fluid only has available to it the reduced cross section of the shunt duct 23 for discharge, the motion of the piston 6 is retarded. The retarding action is dependent on the setting of the damping choke 24.

During the outward stroke indicated by arrow 26 there is a damping action as the respective terminal position is approached. The respective means of the damping device 16 are provided with identical reference numerals with the addition of an apostrophe '.

The damping principle, which has just been described is known as such and is for example described in the German patent publication 3,427,690 A1, which is incorporated herein by reference.

The two drive fluid ducts 12 and 13 open at their ends remote from the working space 7 and 8, at a mounting surface 26 of one of the housing end plates 4 and 5. Preferably it is a question of the rear housing end plate 4 remote from the piston rod 14. The one drive fluid duct 12 extends for this purpose directly within this housing end plate 4 as far as the opening 27 on the mounting surface 26. The drive fluid duct 13 of the other housing end plate 5 is returned in a tube 32 to the rear housing end plate 4 and also ends in an opening 28 in the mounting surface 26. The drive fluid duct 13 is therefore constituted by terminal duct sections of the housing end plates 4 and 5 and a central duct section extending in the tube 32. The tube 32 preferably extends in parallelism to the tubular housing portion 3 radially outward adjacent to the same, but however could take the form of an integral component of the wall of the said housing portion 3.

Furthermore a drive fluid return duct 33 and two discharge ducts 34 and 35 open as well at the mounting surface 26. They are, like the drive fluid ducts 12 and 13, connected with a power valve 36, which is detachably secured to the mounting surface 26 of the housing end plate 4. Here it is a question for example of a 5/2 way valve, whose two venting outlets are connected with the discharge ducts 34 and 35, its drive fluid inlet being connected with the drive fluid supply duct 33 and its power outlets being connected via the openings 27 and 28 with the drive fluid ducts 12 and 13.

The drive fluid supply duct 33 extends in the interior of the housing end plate 5 and terminates in a connection device 37 secured to the housing end plate 4, with which device a drive fluid duct 38 extending to a drive fluid supply is joined. The connection device 37 preferably is located on the same mounting surface 26 as the power valve 36, the mounting surface 26 being a substantially flat, lateral external surface of the housing end plate 4.

The power valve 36 is provided with actuating means 39, which are more especially fluid controlled. They may more especially comprise actuating pistons, which may shift the valve member of the power valve 36. The fluid power actuating signal is preferably transmitted via at least control duct 40 from at least one pilot valve 44, which is also secured to the housing end plate 4 and is operated by means of electrical signals. More particularly solenoid valves are provided as pilot valves. They are preferably secured to the end 45, facing axially away from the tubular housing portion 3, of the housing end plate 4, the same being best accommodated in a chamber 46, which is sealed off from the outside and which is for instance located under a protective hood 47 secured in a removable fashion on the housing end plate 4. A printed circuit board 48 may also be provided here, with which the pilot valves are electrically connected and for their part communicate with electrical leads 49, which extend via an electrical coupling 50 to the outside for connection with a power supply and/or a control device.

Figure 3:
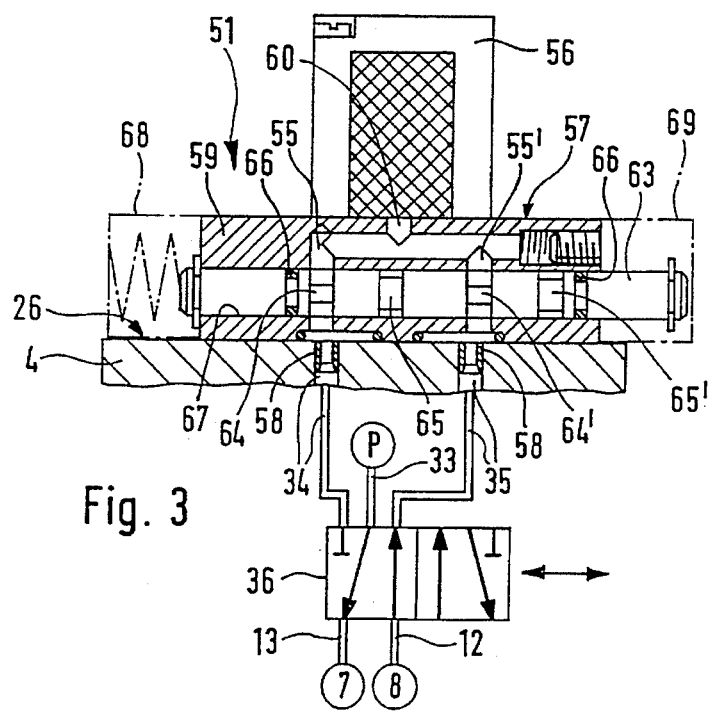
FIG. 3 is a longitudinal section taken through the setting device of FIG. 2 on the line III—III, the connection with a power valve provided for the operation of the drive cylinder being emphasized.

On the cylinder housing 2 a setting device 51 is furthermore mounted, more especially in a detachable fashion. Its structure is to be seen in detail in FIG. 3. Preferably it is also mounted on the drive fluid duct 4, which bears the power valve 36 and the pilot valves 44, it preferably being flange-mounted on the above mentioned mounting surface 26. All the main components for the control of the drive cylinder 1 are accordingly concentrated on one or two external surfaces of the housing end plate 4, which in the present case is square. This opens up good possibilities for access for servicing the equipment.

The said setting device 51 possesses two setting ducts 55 and 55' which at one end open at the lower side of the setting device 51, on which the latter is mounted on the cylinder housing 2. The associated openings of the setting ducts are in this respect connected with the above mentioned discharge ducts 34 and 35, whose end parts remote from the power valve 36 open at the mounting location on the mounting surface 26 provided for the setting device 51. The discharge ducts 34 and 35 may be kept quite short, since the power valve 36 and the setting device 51 are arranged directly adjacent to each other.

The two setting ducts 55 and 55' consequently communicate at the inlet end with the discharge ducts 34 and 35. At the outlet end they lead to a silencer 56, which is more particularly mounted on the upper side of the setting device 51. Each setting duct 55 and 55' could be provided with its own silencer. However the illustrated arrangement is preferred in which there is a common silencer 56 for both setting ducts 55 and 55' which in the interior of the setting device 51 may even be connected together so that they open via a common outlet 60 on the top side 57 facing away from the housing end plate 4, where the silencer 56 is directly connected.

During operation of the drive cylinder 1 the supply and discharge of drive fluid to and from the working spaces 7 and 8 are controlled by the power valve 36. In the two possible switching positions of the power valve 36 one respective one of the working spaces 7 and 8 is supplied with drive fluid so that the piston 6 is moved and the respective other working space 8 or 7 has drive fluid displaced from it, which now passes via the power valve 36 into one or other of the discharge ducts 34 and 35. Dependent of the direction of the stroke of the piston 6 drive fluid therefore passes from the downstream working space into one of the two other working spaces 34 and 35.

The discharging drive fluid now passes via the respective discharge duct 34 and 35 into the associated setting duct 55 and 55' of the setting device 51 and thence via the silencer 56 into the surroundings.

The speed of the stroke of the piston 6 during a non-damped normal stroke is in the present case determined mainly by the flow cross section of the respective discharge duct 34 and 35. For this purpose it is possible, as illustrated, to provide a so-called set or fixed value choke 58 in each of the discharge ducts 34 and 35, which choke is preferably constituted by a separate and more particularly nozzle-like choke member, which is permanently mounted in the respective discharge duct 34 and 35 and is more especially press fitted therein. Accordingly there is a permanent setting of the resistance to flow and any inaccuracies in manufacture as regards the ducts in the housing end plate 4 or 5 are of no significance.

The setting device 51 is able to be switched over between two speed preset settings or values, in which the discharged drive fluid is opposed by different resistances to fluid. In the preferred embodiment of the invention two such speed preset values are possible. In the first speed preset value position depicted in FIG. 3 the resistance to flow opposing the discharging drive fluid in the respective setting duct 55 and 55' is substantially less than the one caused by the fixed value chokes 58. The setting device 51 in this case has practically no effect of the discharging volumetric fluid. If the setting device 51 is however switched over into the second speed preset value, which is not illustrated, then the resistance to fluid caused by the setting ducts 55 and 55' will be increased to a level above the resistance of the fixed value chokes 58. There is then practically a series arrangement of respectively one choke on the housing side and one choke on the device side, the reduced cross sectional area of the setting ducts 55 and 55' being more particularly responsible for the fact that discharge may only take place to the silencer 56 at a volume rate less than with the first speed preset value.

Since the drive fluid expelled from the working spaces 7 and 8 is always discharged through the setting device 51, the selected speed preset value thereof is responsible for the normal speed. While the resistances to flow of the setting device 51 are also effective for the braked stroke of the piston 6 as well, they only play a subordinate role, if at all, since the resistance to flow due to the damping chokes 24 and 24' is substantially greater and modulates the resistance to flow of the setting device 51 and also of the fixed value chokes 58.

In the specific embodiment of the invention the setting device 51 has a housing 59, in which a slide 63 is mounted for axial movement. In the case of such slide it is preferably a question of a spool, which for each setting duct 55 and 55' has two axially spaced flow control parts 64 and 65; 64' and 65', that is to say for each speed preset value there is per setting duct 55 and 55' one flow control part. In the present case the slide 63 is so arranged that it runs through the two setting ducts 55 and 55' and the control parts 64, 64'; 65, 65' are constituted by parts with different slide cross section, which are able to be positioned by shifting the slide 63 in the setting ducts 55 and 55'. For instance it is a question of annular groove-like cuts in the slide of different depth.

In the illustrated working embodiment of the invention the slide 63 possesses two possible positions, which correspond to the two speed preset values. In the illustrated first slide setting the two first flow control parts 64 and 64' are aligned with the two setting ducts 55 and 55'. After switching over the setting device 51 the two second flow control parts 65 and 65' are in the course of the respective setting duct 55 and 55'. It is in this manner that simply by shifting the slide a change in the flow cross section of the setting ducts 55 and 55' is possible so that the intensity of the choking action can be changed.

The setting device 51 illustrated in the present example has a very simple structure and is designed for direct manual operation. The slide 63 extends from opposite ends of the housing 59 of the device, seal rings 66 being preferably provided where it extends through, such seal rings being snapped into an annular groove in the slide 63 or of the slide receiving means 67. The length of the slide is set in accordance with the length of the slide receiving means 67 so that the slide 63 has an end section thereof extending out from the slide receiving means 67 at one end or the other. By pressing against the projecting end of the slide 63 by hand it is possible to readily shift the same into the one or the other position.

Easy operation is naturally possible if the setting device 51 is able to be remotely controlled. For this purpose a pneumatic actuating piston and a return spring can be provided. The arrangement will be then for example so designed that the setting device is in the starting position under the action of the return spring in the setting for damping small masses, which in the working example is the first speed preset value depicted in FIG. 3. Using a pneumatic control signal the setting device may be switched over into the second speed preset position or value, said signal then acting on a drive piston connected with the slide. In the illustrated working embodiment of the invention a modified design with a corresponding further development is shown in broken lines. The reader will recognize a return device 68 at one end of the slide receiving space 6T and at the other end an actuating 69, which comprises an actuating piston not illustrated in detail. The fluid power control of the actuating device 69 is preferably via a pilot valve, which like the pilot valve 44 for the power valve 36 may be accommodated in the chamber 46.

In connection with machine tools drive cylinders are frequently mounted with the piston rod vertical. Dependent on the weight of the object to be moved by the piston rod—as a rule—a production tool, there are different normal speeds of the piston as a rule while the operational pressure remains constant.

Using the setting device 51 it is now possible to adapt the normal speed to the respective load in question so that in each case an optimum transition from the regular to the damped motion phase is possible.

It will be clear that the setting device may also be so designed that it is only effective in one stroke direction.

It is furthermore to be pointed out that in the case of a setting device 51 acting in either direction of the stroke the flow cross sections for the individual flow ducts 55 and 55' can be made different so that more especially in the case of vertical mounting of the drive cylinder 1 different effects of gravity on the piston speed may be taken into account.

Figure 4:
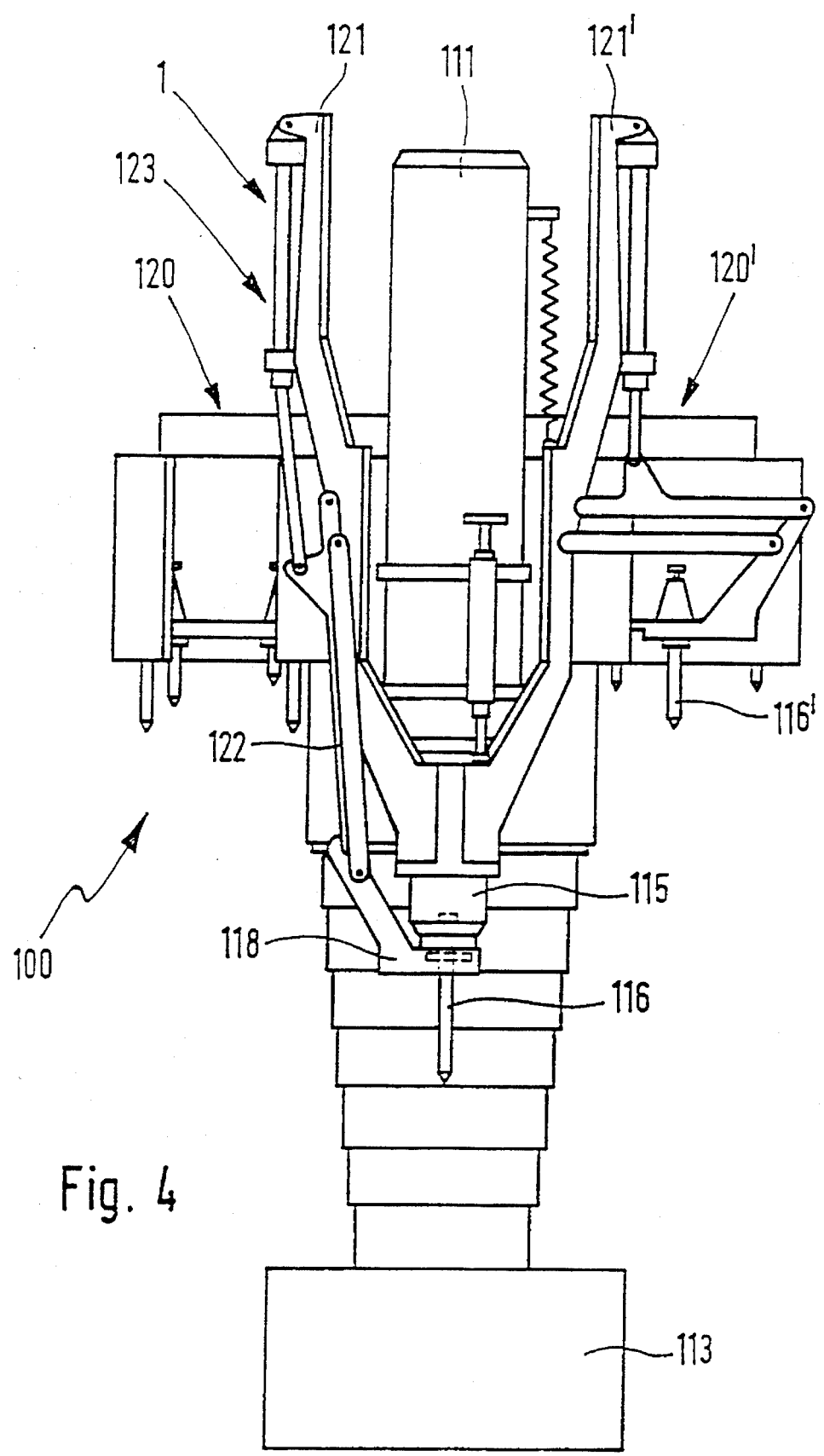
FIG. 4 shows a machine tool fitted with the drive cylinder arrangement.

The drive cylinder 1 described herein has a wide variety of applications. One preferred, but not exclusive application is the use as a drive unit for the tool changer of a machine tool. In FIG. 4 this particular application is illustrated in more detail in a preferred arrangement. As regards details in this case reference numeral 100 indicates a machine tool with an arbor carrier 111, which is arranged on a base 113. In a headstock 115 a production tool 116 is inserted, which is held by a holder 118 of a tool changer generally referenced 120. The tool changer 120 comprises a rigid part 121, on which a parallelogram linkage 122 is secured in an articulating fashion, which for its part bears the holder 118. Between the rigid part 121 and the parallelogram linkage 122 the drive cylinder 1 is arranged as a drive unit 123, which has already been described in connection with the FIGS. 1 through 3 herein.

When the drive unit 123 is located in the outward position, as illustrated in FIG. 4 to the left, the production tool 116 is located in its working position. The machine tool 100 is provided with at least one further tool changer 120', which is depicted on the right in FIG. 4 and bears a production tool 116', which is located in its magazine position.

Although the two tool changers 120 and 120' are identical in design, it is possible for the production tools 116 and 116' to have substantially different weights. Owing to the direct mounting of the setting device 51 on the cylinder housing of the drive cylinder 1, which device is illustrated in FIG. 4, it is possible for the drive cylinder 1 to be quickly adapted to the various different conditions of use, as was explained initially at length. Owing to the fact that the setting device is arranged on the drive cylinder, there is a compact design, which facilitates the assembly of the machine tool 100. No additional provision of circuitry or assembly of furthermore units is required in order to adapt the damping action to different weights of the production tools.

We claim:

1. A machine tool (100) comprising a headstock (111) and at least one tool changer (120) adapted to move production tools (116) between a magazine position and a working position, and at least one fluid power drive cylinder (1) associated with the tool changer (120) as a drive unit (123), said cylinder having a cylinder housing (2), in which an axially moving piston (6) is arranged, for whose terminal damping a damping device is provided, characterized by a setting device (51) n fluid communication with the drive cylinder (1), the setting device including a shiftable member having means for providing differential flow to provide at least two preset values of terminal damping.

2. The machine tool as claimed in claim 1, characterized in that the setting device (51) is mounted on the drive cylinder (1).

3. The machine tool as claimed in claim 1, characterized in that the principle of operation of the damping device (16) is based on an increase, effective as from a particular piston position, of the fluid force opposing the actual stroke direction and action on the piston, this causing a braking effect with a piston speed which is reduced below the preceding normal speed.

4. The machine tool as claimed in claim 1, characterized in that the setting device (51) communicates with a discharge duct (34 and 35), adapted to be connected with a downstream working space (7 and 8) of the drive cylinder (1) so that drive fluid leaving such downstream working space (7 and 8) discharges through the setting device (51), the setting device (51) being able to be switched over between at least two speed preset values, in which the discharging drive fluid is opposed by different resistances to flow, which are respectively effective both in the case of normal movement taking place at the normal speed and also in the case of braked movement of the piston (6).

5. The machine tool as claimed in claim 1, characterized in that the terminal position damping is caused by a reduction of the discharge flow cross section available for drive fluid expelled from the downstream working space (7 and 8) by the piston (6).

6. The machine tool as claimed in claim 1, characterized in that the setting device (51) is able to be switched over by at least one actuating device (68) cooperating with the setting device (51) and arranged more particularly on the setting device (51).

7. The machine tool as claimed in claim 1, wherein the shiftable member is a moving slide (63), which in order to obtain the individual speed preset values, is able to be positioned in different positions thereof.

8. The machine tool as claimed in claim 7, characterized in that the setting device (51) possesses a setting duct (55 and 55') connected with the discharge duct (34 and 35), and in which the slide is intermediately placed so that the discharge drive fluid moves past the slide, for the individual speed preset setting the slide (63) having different flow control parts (64, 64'; 65 and 65'), which are able to be positioned consecutively adjacent to the setting duct (55 and 55') and are responsible for passage cross sections of different size for the setting duct (55 and 55').

9. The machine tool as claimed in claim 8, characterized in that the slide (63) is spool slide, in the case of which the flow control parts (64, 64'; 65 and 65') are constituted by parts of different flow cross section, more particularly in the form of circumferential grooves of different depth.

10. The machine tool as claimed in claim 1, characterized in that a silencer (56) is directly mounted on the setting device (51) and discharging drive fluid from the setting device (51) is passed through such silencer.

11. The machine tool as claim 8, characterized in that a silencer (56) is directly mounted on the setting device (51) and discharging drive fluid from the setting device (51) is passed through such silencer, and wherein the silencer (56) is connected with a terminal part opposite to the discharge duct (34 and 35), of the respective setting duct (55 and 55').

12. A machine tool comprising a headstock (111) and at least one tool changer (120) adapted to move production tools (116) between a magazine position and a working position, and at least one fluid power drive cylinder (1) associated with the tool changer (120) as a drive unit (123), said cylinder having a cylinder housing (2), in which an axially moving piston (6) is arranged, for whose terminal damping a damping device is provided, characterized by a setting device (51) associated with the drive cylinder (1), by means of which such terminal damping can be switched over between at least two preset values, wherein the setting device (51) communicates with two discharge ducts (34 and 35), which are adapted to be connected respectively with one of the two working spaces (7 and 8) in the drive cylinder (1) divided apart by the piston (6), each speed preset value simultaneously setting the resistance to flow for both stroke directions (22 and 23) of the piston (6), and two setting ducts (55 and 55') are provided in the setting device (51), which at the input and are respectively connected with one of the two discharge ducts and 35), the two setting ducts having a common outlet (60) on the setting device, and a silencer being connected to the common outlet.

13. A machine tool comprising:
a headstock;
at least one tool changer adapted to move production tools between a magazine position and a working position;
at least one fluid power drive cylinder operating as a drive unit for the tool changer, said fluid power drive cylinder including a housing and an axially reciprocatable piston positioned with an axial bore of said housing;
at least one damping device provided at an axial end of said housing in fluid communication with said axial bore to provide a terminal damping to said drive cylinder piston; and
a setting device in fluid communication with said drive cylinder, said setting device including a shiftable member having means for providing differential flow to provide at least two preset values of terminal damping.

14. A machine tool comprising a headstock (111) and at least one tool changer (120) adapted to move production tools (116) between a magazine position and a working position, and at least one fluid power drive cylinder (1) associated with the tool changer (120) as a drive unit (123), said cylinder having a cylinder housing (2), in which an axially moving piston (6) is arranged, for whose terminal damping a damping device is provided, characterized by a setting device (51) associated with the drive cylinder (1), by means of which such terminal damping can be switched over between at least two preset values, and a power valve (36) arranged on the drive cylinder (1) adjacent to the setting device (51), such power valve being connected with the discharge duct (34 and 35) communicating at one end with the setting device (51), the discharge ducts (34 and 35) preferably extending in the interior of cylinder housing (2).

15. A machine tool comprising a headstock (111) and at least one tool changer (120) adapted to move production tools (116) between a magazine position and a working position, and at least one fluid power drive cylinder (1) associated with the tool changer (120) as a drive unit (123), said cylinder having a cylinder housing (2), in which an axially moving piston (6) is arranged, for whose terminal damping a damping device is provided, characterized by a setting device (51) associated with the drive cylinder (1), by means of which such terminal damping can be switched over between at least two preset values, the setting device (51) communicates with a discharge duct (34 and 35), adapted to be connected with a downstream working space (7 and 8) so that drive fluid leaving such downstream working space (7 and 8) discharges through the setting device (51), the setting device (51) being able to be switched over between at least two speed preset values, in which the discharging drive fluid is opposed by different resistances to flow, which are respectively effective both in the case of normal movement taking place at the normal speed and also in the case of braked movement of the piston (6), and further comprising a a fixed value choke (58) arranged in the discharge duct (34 and 35), the resistance to flow due to such choke being in amount between a first and a second resistance to flow able to be preset by the setting device (51).

16. The machine tool as claimed in claim 1, characterized in that the setting device (51) is an integral component of the cylinder housing (2).

17. A machine tool comprising a headstock (111) and at least one tool changer (120) adapted to move production tools (116) between a magazine position and a working position, and at least one fluid power drive cylinder (1) associated with the tool changer (120) as a drive unit (123), said cylinder having a cylinder housing (2), in which an axially moving piston (6) is arranged, for whose terminal damping a damping device is provided, characterized by a setting device (51) associated with the drive cylinder (1), by means of which such terminal damping can be switched over between at least two preset values, and wherein the setting device (51) is mounted with its lower surface against the drive cylinder (1) and on its top side (57) bears a silencer (56).

18. The machine tool as claimed in claim 14, characterized in that the power valve (36) is a 5/2 way valve, whose two outlets communicate with the discharge ducts (34 and 35) and whose two working outlets communicate with the working spaces (7 and 8), its drive fluid inlet communicating with a drive fluid supply duct (33) extending in the interior of cylinder housing (2), such supply duct leading to a connection device (37), set on the cylinder housing (2), for at least one drive fluid line.

19. The machine tool as claimed in claim 4, characterized by at least one electrically operated pilot valve (44) mounted on the cylinder housing (2) and communicating via ducts (40) extending in the interior of cylinder housing (2) with the power valve (36) and which is accomodated in a chamber (46) in the drive cylinder (1) able to be opened and having further means for the electrical control of the drive cylinder (1) and more particularly of the setting device (51).

* * * * *

UNITED STATES PATENT AND TRADEMARK OFFICE
CERTIFICATE OF CORRECTION

Page 1 of 2

PATENT NO. : 5,514,063
DATED : May 7, 1996
INVENTOR(S) : Stoll, et al.

It is certified that error appears in the above-indentified patent and that said Letters Patent is hereby corrected as shown below:

Column 2, Lines 37-38,   now reads "pro-establishes", should read --pre-establishes--;

Column 3, Line 7,   delete "an";

Column 3, Line 55,   now reads "Strikes", should read --strikes--;

Column 3, Line 60,   now reads "Stroke", should read --stroke--;

Column 7, Line 20,   now reads "55',", should read --55'.--;

Column 7, Line 51,   now reads "6T", should read --67--;

UNITED STATES PATENT AND TRADEMARK OFFICE
CERTIFICATE OF CORRECTION

PATENT NO. : 5,514,063
DATED : May 7, 1996
INVENTOR(S) : Stoll, et al.

It is certified that error appears in the above-indentified patent and that said Letters Patent is hereby corrected as shown below:

Column 8, Line 53,  now reads "n fluid", should read --in fluid--;

Column 9, Line 45,  after "as", insert --claimed in--;

Column 10, Line 3,  after "discharge ducts", insert --(34--;

Column 10, Lines 50-51,  after "(7 and 8)", insert --of the drive cylinder (1)--;

Column 10, Line 58,  now reads "comprising a a", should read --comprising a--.

Signed and Sealed this

Twenty-seventh Day of August, 1996

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,514,063
DATED : May 7, 1996
INVENTOR(S) : Stoll, et. al.

It is certified that error appears in the above-indentified patent and that said Letters Patent is hereby corrected as shown below:

Title page, item [73], Assignee: should read--Chiron - Werke GmbH & Co. KG, Tuttlingen, Germany, and Festo KG, Esslingen, Germany--.

Signed and Sealed this

Twenty-sixth Day of November 1996

Attest:

BRUCE LEHMAN

Attesting Officer

Commissioner of Patents and Trademarks